US008543723B2

(12) United States Patent
Iwamura

(10) Patent No.: US 8,543,723 B2
(45) Date of Patent: Sep. 24, 2013

(54) HOME NETWORK SYSTEM WITH TRANSMISSION ERROR RECOVERY

(75) Inventor: Ryuichi Iwamura, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 2299 days.

(21) Appl. No.: 10/951,739

(22) Filed: Sep. 27, 2004

(65) Prior Publication Data

US 2006/0026295 A1    Feb. 2, 2006

Related U.S. Application Data

(60) Provisional application No. 60/591,455, filed on Jul. 27, 2004.

(51) Int. Cl.
   *G06F 15/16*    (2006.01)

(52) U.S. Cl.
   USPC .......... 709/233; 709/201; 709/203; 709/220; 709/232

(58) Field of Classification Search
   USPC ................ 709/231, 232, 233, 234, 246, 220, 709/221, 222, 227, 228, 229, 236, 237; 370/240
   See application file for complete search history.

(56) References Cited

U.S. PATENT DOCUMENTS

| | | | |
|---|---|---|---|
| 4,300,207 A | 11/1981 | Eivers et al. | 364/900 |
| 4,593,155 A | 6/1986 | Hawkins | 455/411 |
| 4,649,428 A | 3/1987 | Jones et al. | 358/188 |
| 4,852,043 A | 7/1989 | Guest | 364/900 |
| 4,884,287 A | 11/1989 | Jone et al. | 375/121 |
| 4,908,848 A | 3/1990 | Hanawa | 455/565 |
| 4,989,081 A | 1/1991 | Miyagawa et al. | 358/93 |
| 5,036,532 A | 7/1991 | Metroka et al. | 455/566 |
| 5,109,403 A | 4/1992 | Sutphin | 455/419 |
| 5,243,653 A | 9/1993 | Malek et al. | 380/272 |
| 5,287,547 A | 2/1994 | Hidaka | 455/4.2 |
| 5,297,192 A | 3/1994 | Gerszberg | 455/419 |
| 5,398,285 A | 3/1995 | Borgelt et al. | 380/30 |
| 5,485,630 A | 1/1996 | Lee et al. | 455/422 |
| 5,579,308 A | 11/1996 | Humpleman | 370/58.1 |
| 5,619,722 A | 4/1997 | Lovrenich | 395/822 |
| 5,649,123 A | 7/1997 | Kowert | 395/289 |
| 5,649,129 A | 7/1997 | Kowert | 395/309 |
| 5,761,416 A | 6/1998 | Mandal et al. | 395/200.08 |
| 5,905,942 A | 5/1999 | Stoel et al. | 455/4.2 |
| 5,936,887 A | 8/1999 | Choi et al. | 365/185.17 |
| 5,940,387 A | 8/1999 | Humpleman | 370/352 |
| 5,973,722 A | 10/1999 | Wakai et al. | 348/8 |
| 6,005,861 A | 12/1999 | Humpleman | 370/352 |
| 6,078,806 A | 6/2000 | Heinonen et al. | 455/406 |
| 6,091,956 A | 7/2000 | Hollenberg | 455/456.5 |
| 6,108,727 A | 8/2000 | Boals et al. | 710/68 |
| 6,128,389 A | 10/2000 | Chan et al. | 380/247 |
| 6,137,473 A | 10/2000 | Cortopassi et al. | 345/156 |
| 6,202,211 B1 | 3/2001 | Williams, Jr. | 725/78 |
| 6,279,153 B1 | 8/2001 | Bi et al. | 717/171 |
| 6,366,487 B1 | 4/2002 | Yeom | 365/152 |

(Continued)

*Primary Examiner* — Dhairya A Patel
(74) *Attorney, Agent, or Firm* — John L. Rogitz

(57) ABSTRACT

A client TV in a home entertainment network receives and buffers an audio/video stream from a server, before playing the stream. In the case of buffer underflow, the client TV requests the server to raise the transmission rate. If this causes an ensuing buffer overflow, the client TV requests the server to reset the transmission rate or stop transmitting altogether for a short time.

6 Claims, 4 Drawing Sheets logic for playback
from server HDD

(56) References Cited

U.S. PATENT DOCUMENTS

| | | | |
|---|---|---|---|
| 6,401,159 B1 | 6/2002 | Wang | 710/315 |
| 6,424,827 B1 | 7/2002 | McGregor et al. | 455/411 |
| 6,445,914 B1 | 9/2002 | Findikli et al. | 455/411 |
| 6,473,609 B1 | 10/2002 | Schwartz et al. | 455/406 |
| 6,493,874 B2 | 12/2002 | Humpleman | 725/78 |
| 6,526,581 B1 | 2/2003 | Edson | 725/74 |
| 6,584,080 B1 | 6/2003 | Ganz | |
| 6,622,304 B1 | 9/2003 | Carhart | 725/74 |
| 6,628,934 B2 | 9/2003 | Rosenberg et al. | 455/411 |
| 6,662,023 B1 | 12/2003 | Helle | 455/558 |
| 6,665,020 B1 | 12/2003 | Stahl et al. | 348/552 |
| 6,678,892 B1 | 1/2004 | Lavelle et al. | 725/75 |
| 6,696,919 B1 | 2/2004 | Leickel et al. | 340/5.74 |
| 6,891,822 B1 * | 5/2005 | Gubbi et al. | 370/345 |
| 6,961,377 B2 * | 11/2005 | Kingsley | 375/240.12 |
| 7,012,899 B1 * | 3/2006 | Hagler et al. | 370/252 |
| 2002/0012329 A1 | 1/2002 | Atkinson et al. | 370/330 |
| 2002/0026614 A1 | 2/2002 | Park | |
| 2002/0036993 A1 | 3/2002 | Park | |
| 2002/0107947 A1 | 8/2002 | Moragne et al. | 709/223 |
| 2002/0136184 A1 | 9/2002 | Liang | |
| 2003/0093812 A1 | 5/2003 | Chang et al. | 725/133 |
| 2003/0161302 A1 * | 8/2003 | Zimmermann et al. | 370/363 |
| 2003/0231594 A1 | 12/2003 | Xu | |
| 2004/0100934 A1 | 5/2004 | Kachi | |
| 2005/0177848 A1 * | 8/2005 | Hyun | 725/44 |

* cited by examiner

Power Line Network

Server Block Diagram

Client TV logic for playback
from server HDD

HOME NETWORK SYSTEM WITH TRANSMISSION ERROR RECOVERY

RELATED APPLICATIONS

This application claims priority from U.S. provisional patent application Ser. No. 60/591,455, filed Jul. 27, 2004.

BACKGROUND OF THE INVENTION

1. Field of the Invention

The present invention relates generally to home entertainment systems.

2. Description of the Related Art

Home entertainment systems have been provided that can include a set-top box media server that communicates with various components in the home, e.g., TVs, laptop computers, and custom display devices. Home network communication technologies (e.g., 802.11 wireless, UWB (Ultra Wide Band), PLC (Power Line Communication), etc.) are widely used as their costs decrease.

As critically recognized herein, wireless home networks are not as reliable as wired and dedicated networks such as Ethernet. Consequently, audio/video data packets frequently can be lost ("dropped") in transmission. When a transmission is not time critical, retransmission of a dropped packet is not a problem. An example of such a non-time critical transmission is a file transfer that can be performed using Transmission Control Protocol/Internet Protocol (TCP/IP), which includes a retransmission mechanism.

However, for time critical audio/video (A/V) streaming, retransmission can be problematic. Usually, a client, such as a TV, has a limited amount of buffer to decode the A/V stream and pass the decoded data on for playing. Retransmission takes time, and this can cause underflow of the client buffer, meaning that the buffer can empty itself of data before dropped packets are received pursuant to retransmission. Also, an opposite problem can occur at the home network system server, namely, during retransmission, new data can arrive from the outside source (cable, antenna, etc.) and the server's transmission data buffer overflows, because the server holds the new data in its buffer until the dropped packet is received by the client. As understood herein, this problem can be serious particularly in the case of live streaming, because the stream rate is not controllable at all. As further recognized herein, the above-mentioned problems of buffer underflow and overflow can cause visible video errors or audible noise, diminishing the quality of the A/V display and, thus, the viewer's enjoyment.

SUMMARY OF THE INVENTION

A home entertainment system includes a server and at least one client component communicating with the server on a network path. The client component buffers data received from the server and monitors the amount of buffered data. If it is determined that the amount of buffered data falls below an underflow threshold, the client component sends a request to the server to raise the rate at which data is transmitted. If it is determined that the amount of buffered data exceeds an overflow threshold subsequent to raising the rate at which data is transmitted, the client component requests the server to reset the transmission rate back to an original rate, or it requests the server to stop transmission altogether.

In some implementations an MPEG transcoder in the server is used for automatic bit rate control of data transmitted to the client component. Under unfavorable network conditions the transcoder can transcode a data stream to a lower bit rate stream and send the lower bit rate stream faster than a normal operating data transfer rate. The server may receive the data from a source of live audio/video data and may buffer the data before sending the data to the client component. Or, a live stream can be recorded by the client component in a buffer, with the amount of buffered data being controlled between two thresholds during playing of the data to avoid over/underflow. The client component may be selected from the group of components consisting of: televisions, and portable computers.

In another aspect, a method is disclosed for playing an audio/video stream on a client TV communicating with a server in a home entertainment network. The method includes transmitting the stream from the server to the client TV, and while transmitting, buffering the stream at the client TV. The method also includes playing the stream at the client TV, monitoring an amount of buffered data during the playing act, and, in the event that the amount of buffered data falls below an underflow threshold, increasing the rate at which the stream is transmitted from the server to the client TV.

In still another aspect, a TV that is configured for use in a home entertainment network including a server and a network communication path includes means for monitoring a data buffer and means for comparing an amount of data in the buffer to an underflow threshold. Means are provided for causing the server to increase the rate at which data is transmitted to the TV over the network if the amount of data in the buffer falls below the underflow threshold. Also, means are provided for causing the server to undertake at least one of: decreasing the rate at which data is transmitted to the TV over the network, and temporarily stopping transmission to the TV, if the amount of data in the buffer rises above an overflow threshold.

BRIEF DESCRIPTION OF THE DRAWINGS

The details of the present invention, both as to its structure and operation, can best be understood in reference to the accompanying drawings, in which like reference numerals refer to like parts, and in which.

DETAILED DESCRIPTION OF THE PREFERRED EMBODIMENTS

In the preferred non-limiting embodiment shown, the processors described herein may access one or more software or hardware elements to undertake the present logic. The flow charts herein illustrate the structure of the logic modules of the present invention as embodied in computer program software, in logic flow chart format, it being understood that the logic could also be represented using a state diagram or other convention. Those skilled in the art will appreciate that the flow charts illustrate the structures of logic elements, such as computer program code elements or electronic logic circuits, that function according to this invention. Manifestly, the invention is practiced in its essential embodiment by a machine component that renders the logic elements in a form that instructs a digital processing apparatus (that is, a computer or microprocessor) to perform a sequence of function steps corresponding to those shown. Internal logic could be as simple as a state machine.

In other words, the present logic may be established as a computer program that is executed by a processor within, e.g., the present microprocessors/servers as a series of computer-executable instructions. In addition to residing on hard disk drives, these instructions may reside, for example, in RAM of the appropriate computer, or the instructions may be stored on magnetic tape, electronic read-only memory, or other appropriate data storage device.

Figure 1:
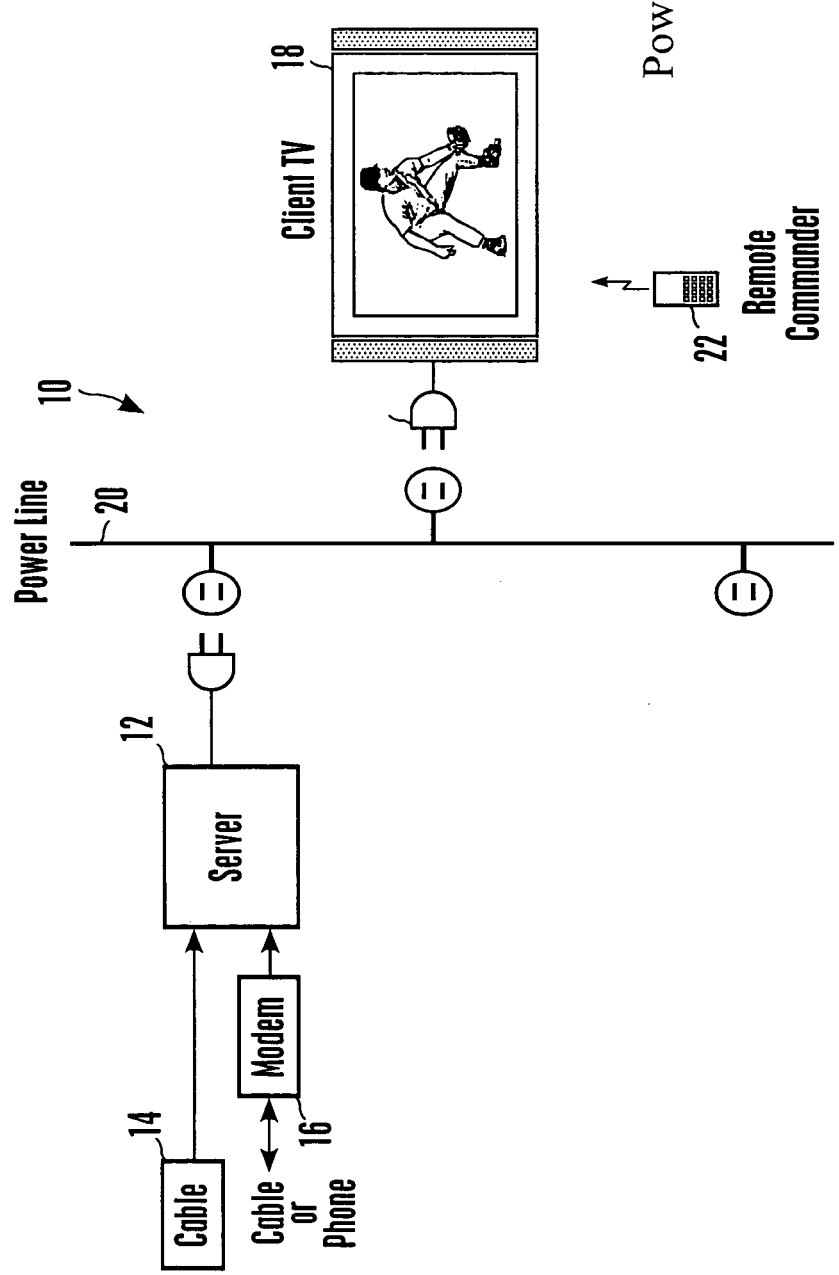
FIG. 1 is a block diagram of a network according to the present invention.

Referring initially to FIG. 1, a system is shown, generally designated 10, which shows an example of a power line network and connected devices. As shown, a home network server 12 can receive an A/V signal from a cable signal receiver 14 or it can receive Internet data, e.g., streaming video, from a computer modem 16. The modem 16 can be, for example, a cable modem or an Asymmetric Digital Subscriber Line (ADSL) modem. In turn, the server 12 sends received audio/video streams to a client player, such as but not limited to a client TV 18, over a power line 20, it being understood that communication between the client and server can also be wireless or can alternatively be wireless. That is, the present invention applies to various types of home networks including those that use Wireless Fidelity (802.11b) (WiFi), Home Phoneline Networking Alliance (HPNA), coaxial cable, Ethernet, and so on.

The client TV 18 decodes the stream and displays decoded video on its screen. If desired, the client TV 18 can wirelessly receive commands such as play, stop, channel up/down, volume up/down from a remote commander 22. Some of these commands, for example, a channel up/down command, can be forwarded to the server 12.

Figure 2:
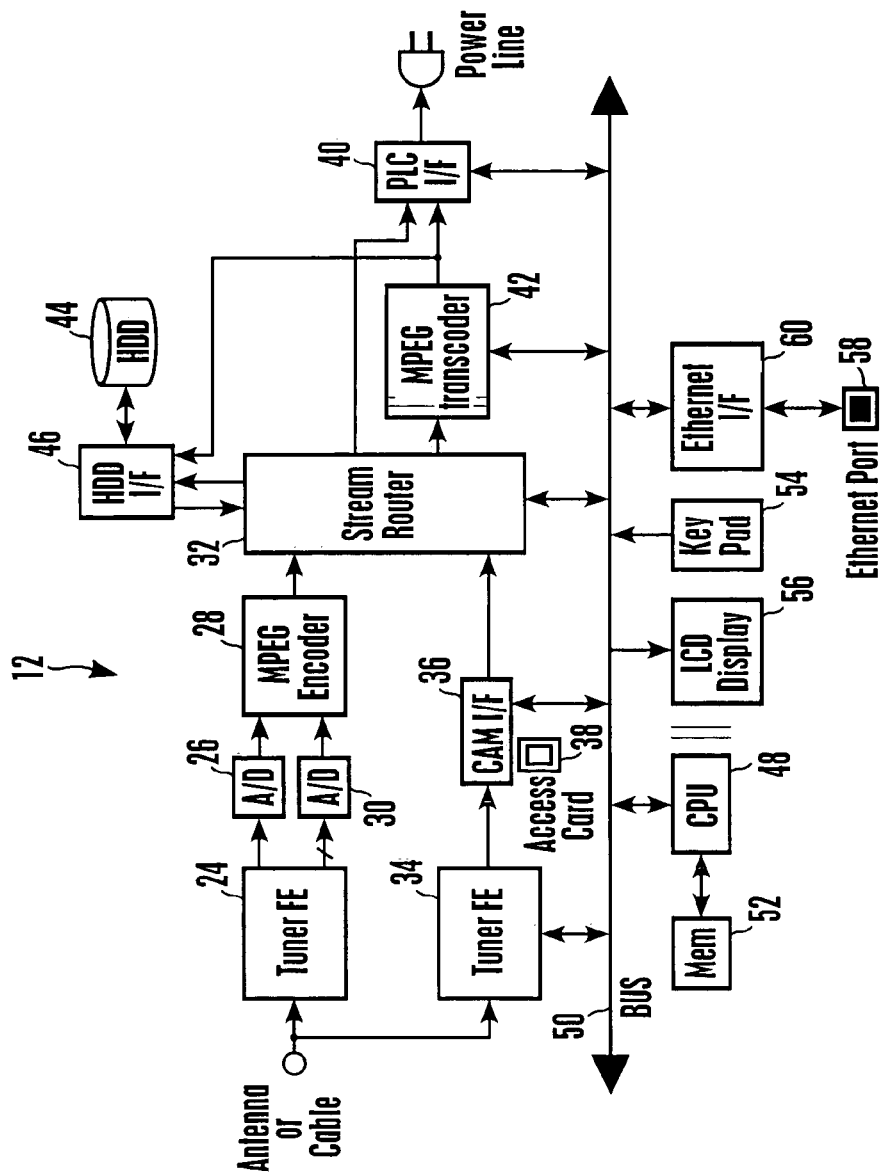
FIG. 2 is a block diagram of the server of the present invention.

FIG. 2 shows a block diagram of the server 12. Analog cable signals are tuned and demodulated in an analog tuner front end 24. The video output from the analog tuner front end 24 is then digitized by a video analog to digital converter 26 and encoded in Motion Picture Engineering Group (MPEG) format in an MPEG encoder 28. Similarly, the audio output from the analog tuner front end 24 is digitized by an audio ADC 30 and MPEG-encoded by the MPEG encoder 28. The A/V stream that is output by the MPEG encoder 28 is then sent to a stream router 32.

In the case of digital cable signals, the digital cable signals can be received for tuning and demodulating at a digital tuner front end 34. The signal that is output by the digital front end 34, which may be encrypted for content protection, can be decrypted in a Conditional Access Module (CAM) interface 36, which can decrypt the stream in cooperation with an access card 38 in accordance with decryption principles known in the art. The decrypted stream is then sent to the stream router 32.

In accordance with home network routing principles, the stream router 32 routes, i.e., establishes the output direction, for each incoming stream. Also, the stream router 32 can multiplex plural streams into one output stream if necessary.

Specifically, the stream router 32 can send an incoming stream from the MPEG encoder 28 directly to a power line communication (PLC) interface 40. In contrast, an incoming decrypted digital cable stream from the CAM interface 36 can be sent to the PLC interface directly or it can be sent to the PLC interface 40 via an MPEG transcoder 42, which transcodes the incoming stream at a lower rate than the original stream in accordance with further disclosure below. In contrast, streams from the MPEG encoder 28 do not need separate transcoding because the MPEG encoder 28 can be used to directly adjust the bit rate of the stream in accordance with present principles set forth below.

In a recording mode, the incoming stream from the MPEG encoder 28 or from the CAM interface 36 is sent to a storage, such as a hard disk drive (HDD) 44 with attendant HDD interface 46, which appends a timestamp to each packet in the stream to record. The incoming stream from the CAM interface 36 may be transcoded by the MPEG transcoder 42 before being sent to the HDD 44 for conserving HDD storage space.

Accordingly, when playing back recorded content, a playback stream from the server HDD 44 is sent to the stream router 32 through the HDD interface 46, which injects each packet into the transmitted data based on its timestamp. The stream router 32 can send the stream to the PLC interface 40 directly or via the MPEG transcoder 42 for bit rate reduction in accordance with principles set forth further below, for transmission to the client TV 18 and playing thereon.

Still referring to FIG. 2, the server 12 includes a central processing unit (CPU) 48 that controls the server 12 components through an internal data bus 50, to which the components are connected. Thus, the CPU 48 executes control software, described below, that can be stored in a solid state server memory 52. Also, an input device such as a keypad 54 can be used to input data to the CPU 48 through the bus 50, while an output device such as a liquid crystal display (LCD) 56 can be used to indicate various data from CPU 48, e.g., tuning status, network status, error messages, etc. The modem 16 shown in FIG. 1 can be connected to an Ethernet port 58 so that data from the modem 16 can be sent to the CPU 48 through an Ethernet interface 60 for processing.

Figure 3:
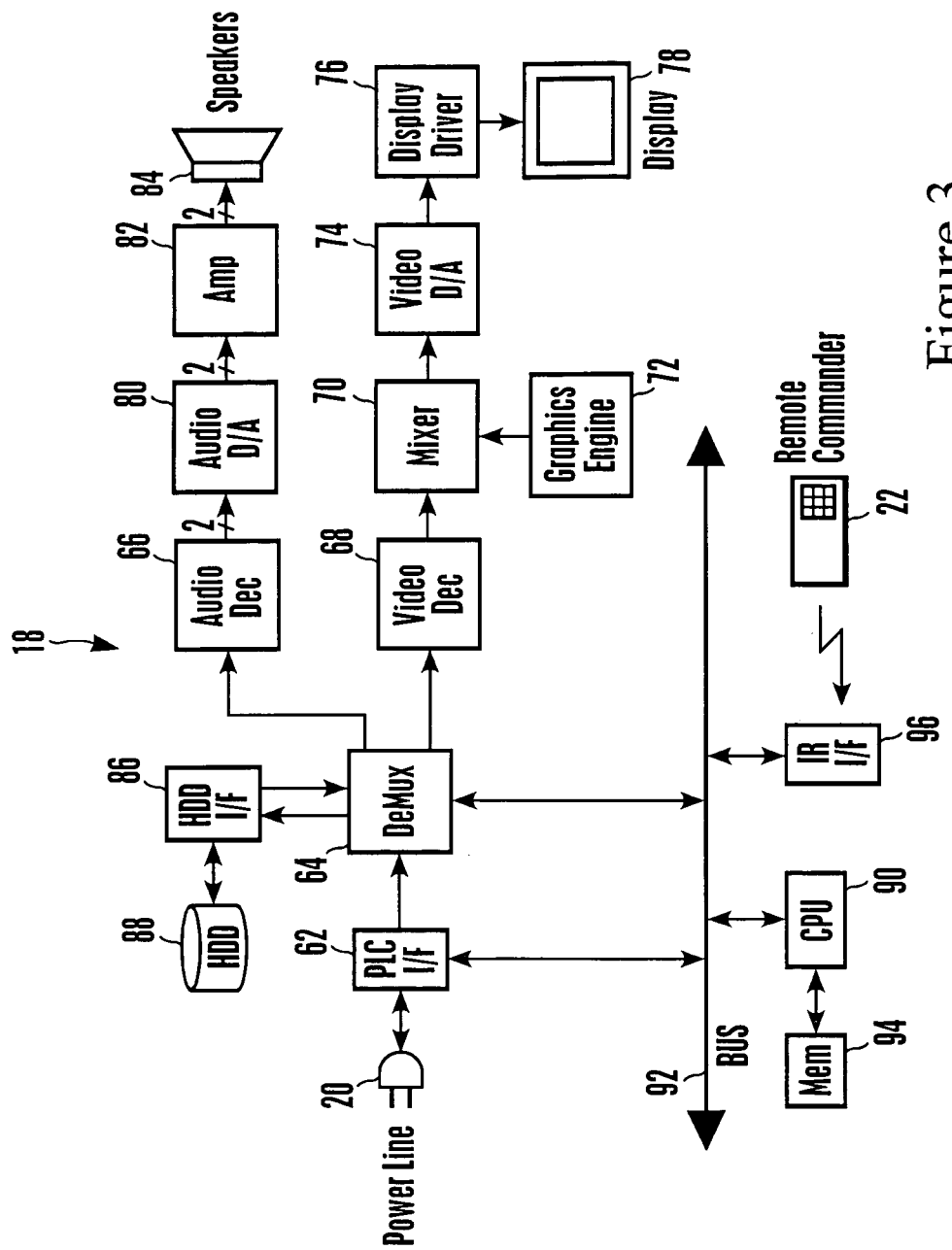
FIG. 3 is a block diagram of a client TV.

Now referring to FIG. 3, a block diagram of the client TV 18 is shown. A PLC Interface 62 can receive signals sent from the server 12 over the power line 20. The output signal from the PLC interface 62 is demultiplexed in a demultiplexer 64, with the audio portion being sent to an audio decoder 66 and with the video portion being sent to a video decoder 68. A mixer 70 receives the video portion and can mix the video with graphics data generated in by a graphics engine 72 if desired. The video is then converted to analog by a video digital to analog converter 74 and sent to a display driver 76, for presentation on a display 78. The display 78 may be a cathode ray tube display or flat panel display or other TV display, and may user either or both standard video format and high definition TV format.

With respect to the analog portion of the stream, once decoded, the audio is analogized at an audio digital to analog converter 80 and amplified by an amplifier 82. The signal is then sent to speakers 84, it being understood that the audio circuitry set forth above can accommodate two or more audio channels as indicated by the "slash 2" symbols in FIG. 3.

The TV 18 can be placed in a recording mode, wherein the demultiplexer 64 sends the incoming stream from the PLC interface 62 to a HDD interface 86. The stream is recorded onto a TV HDD 88. Accordingly, a playback stream may be sent from the HDD 88 to the demultiplexer 64 through the HDD interface 86, with the demultiplexer 64 sending the stream to the audio decoder 66 and video decoder 68 for processing as described above.

As shown in FIG. 3, the TV 18 can include a CPU 90 that exchanges asynchronous data (commands, data, etc.) with the server CPU shown in FIG. 2 over the power line 20. As shown, the CPU 90 can control the PLC interface 62 and demultiplexer 64 through an internal TV data bus 92. Also, the CPU 90 executes logic in accordance with principles set forth herein that may be stored in a TV solid state memory 94. Furthermore, a wireless interface 96 can receive commands from the remote commander 22, e.g., using infrared or radio frequency communication principles known in the art, with the wireless interface 96 being connected to the internal TV data bus 92 for communication with the TV CPU 90.

When an A/V stream that is stored in the server HDD 44 is to be copied to the client TV HDD 88, as recognized herein if a packet drop occurs during transmission, the transmission simply stops and the lost packet is retransmitted without further considerations, since the transfer is not a time critical operation. On the other hand, the present invention understands that retransmission complications can arise in the case wherein an A/V stream that is stored in the server HDD 44 is to be played on the client TV 18.

Figure 4:
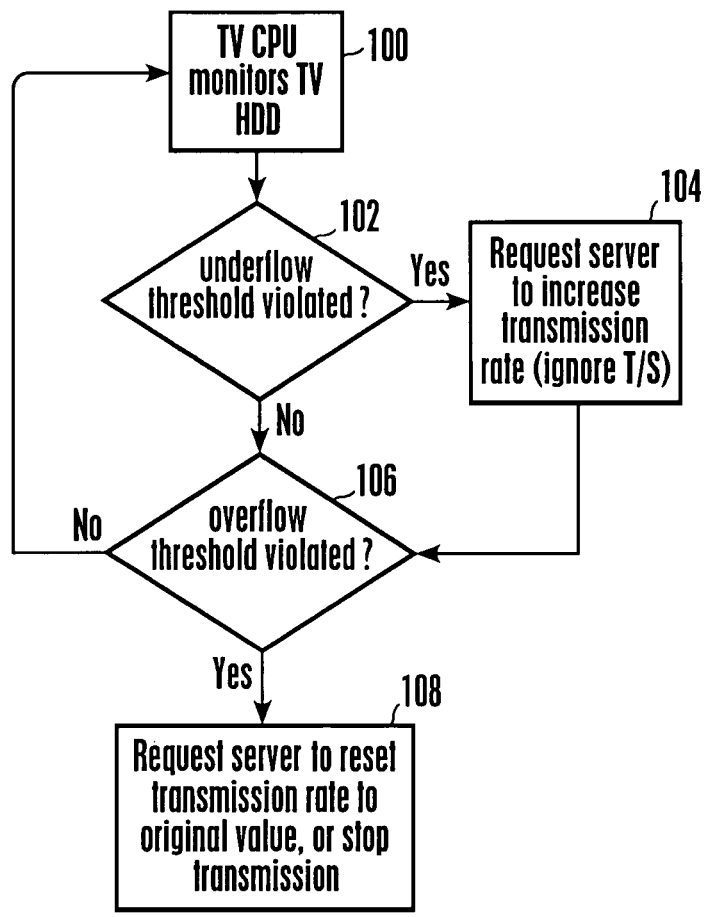
FIG. 4 is a flow chart of the present logic.

More particularly and now referring to FIG. 4, as understood herein the client TV 18 temporarily stores some amount of the stream data, for example data associated with thirty seconds of play, in its HDD 88 for buffering, and then starts A/V decoding. The client TV demultiplexer 64 injects a packet to both the decoders 66 and 68 based on the timestamp of the packet given by the client HDD interface 86 during buffering. As understood herein, if isochronousness is not kept, the decoders 66 and 68 can cause buffer overflow or underflow and consequently some audio/video errors will occur.

Accordingly, at block 100 in FIG. 4 the client TV CPU 90 monitors the amount of buffering in the client TV HDD 88. If it is determined at decision diamond 102 that the amount of buffered data falls below an underflow threshold, the logic proceeds to block 104, wherein the client TV 18 sends a request to the server 12 to raise the transmission rate.

From block 104 or from decision diamond 102 when the test there is negative, the logic proceeds to decision diamond 106, wherein it is determined whether the amount of buffered data exceeds an overflow threshold. If it does the logic proceeds to block 108 wherein the client TV 18 requests the server 12 to reset the transmission rate back to the original value. Alternatively, the client TV CPU 90 may request the server 12 to stop transmission altogether, in which case transmission does not restart until the amount of buffered data falls below the upper threshold again. When the stream is sent at the faster rate than normal, all the timestamps can be ignored. From block 108 or from decision diamond 106 if the test there was negative, the logic loops back to block 100.

It is to be understood that in alternate embodiments the server 12 can monitor the content of the client TV buffer and automatically execute the logic above without waiting for requests from the client TV 18.

As mentioned above, the MPEG transcoder 42 in the server 12 can be used for automatic bit rate control in response to the requests from the client TV discussed in reference to FIG. 4. In case of heavy traffic or unfavorable transmission conditions, the transcoder 42 can reduce the stream bit rate and prevent audio/video corruption at the client TV 18. However, no packet drop error can be saved with this mechanism. Accordingly, to resolve this, the transcoded stream can be sent at a faster rate. When powerline transmission conditions are not good or when the power line network 20 has heavy traffic or otherwise experiences unfavorable conditions, however, the server 12 cannot send the stream at a faster rate, because doing so would require more bandwidth. In such a case, the MPEG transcoder 42 transcodes the stream into a lower rate stream, and all the timestamps should be ignored and the MPEG transcoder 42 run faster than the normal speed.

For example, assume the original rate of the stream is 8 Mbit/sec and that the stream is transcoded to a half rate, 4 Mbit/sec stream. If the MPEG transcoder 42 runs at the original rate, a valid packet will be output in every other packet slot. The bandwidth usage consequently is half that of the original stream, but the time required for transmitting the data remains the same. When a packet drop necessitates a retransmission and, hence, causes some delay, the buffer in the Client TV 18 could underflow. Therefore, as set forth above the MPEG transcoder 42 runs faster, in which case the original bandwidth of 8 Mbit/sec is preserved and the server 12 can send the stream roughly twice as fast, although in practice only 20% to 30% faster speed is sufficient for retransmission recovery.

The above principles can also be applied to recording a live stream from the antenna or cable end onto the client TV HDD 88, which live stream cannot be sent at a faster rate without buffering. The incoming stream is temporarily stored in the server HDD 44, and when the amount of buffered data exceeds a certain threshold, data transmission can start at a faster rate. When the amount of buffered data falls below the threshold, the transmission stops, to avoid buffer underflow. If the bandwidth of the power line 20 is limited, transcoding may be performed as described above.

In this recording mode, the client TV 18 does not consider packet timestamps or buffer over/underflow. Instead, received data packets simply are stored in the client TV HDD 88 one after another. When the stream is played, it is decoded based on the timestamps stored with the packets.

When a live stream is decoded at the client TV 18, the transmission mechanism is the same in live stream recording at the client TV 18. On the client side, received data is temporarily stored in the client HDD 88 and decoded based on the timestamps. The amount of buffered data in the client HDD 88 is controlled between the thresholds discussed above in relation to FIG. 4 to avoid over/underflow.

In specific non-limiting implementations, each client in the system 10 can have a predetermined buffer size. Although a HDD is used in the above examples, a semiconductor memory such as DRAM can also be used. To store a one minute long, 20 Mbit/sec MPEG-HD stream, a capacity of 150 Mbytes (1200 Mbits) is required, whereas for SD streams, less than half that amount is required, placing the required buffer size within the reach of solid state memory devices.

It is to be understood that the principles advanced herein can be applied to audio-only data streams and to other time-critical transmissions, and can also be applied to any network protocol, including isochronous, IP, etc.

As recognized herein, the present invention provides the advantages of rendering the server 12 capable of transmitting a stream to the client at a faster rate than the original rate to save time for retransmission. The client 18 can buffer a certain amount of data and decode the stream, and when a packet drop error occurs during transmission, retransmission is facilitated without audio/video corruption. In the case of a live stream, the server 12 temporarily stores data in its storage and transmits it at a relatively fast rate to the client, so that the client can record or playback the live stream as it does a recorded stream and, hence, facilitate error-free retransmission of dropped packets. In the case when the network is busy or under unfavorable conditions, the server 12 cannot obtain more bandwidth to send the stream faster, in which case the stream is transcoded to a lower bit rate stream and sent faster than the original rate without requiring additional network bandwidth for retransmission.

While the particular HOME NETWORK SYSTEM WITH TRANSMISSION ERROR RECOVERY as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular means "at least one". All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. section 112, sixth paragraph, unless the element is expressly recited using the phrase "means for".

I claim:

1. A home entertainment system, comprising:
   at least one server; and
   at least one client component communicating with the server on a network path,
   wherein the client component buffers data received from the server and monitors the amount of buffered data, wherein if it is determined that the amount of buffered data falls below an underflow threshold, the client component sends a request to the server to raise the rate at which data is transmitted, wherein a transcoder in the server is used for automatic bit rate control of data transmitted to the client component, and further wherein under unfavorable network conditions the transcoder transcodes a data stream to a lower bit rate stream and sends the lower bit rate stream faster than a normal operating data transfer rate.

2. The system of claim 1, wherein if it is determined that the amount of buffered data exceeds an overflow threshold subsequent to raising the rate at which data is transmitted, the client component undertakes at least one of: requesting the server to reset the transmission rate back to an original rate, and requesting the server to stop transmission altogether.

3. The system of claim 1, wherein the server receives the data from a source of live audio/video data and buffers the data before sending the data to the client component.

4. The system of claim 1, wherein a live stream is recorded by the client component in a buffer, the amount of buffered data being controlled between two thresholds during playing of the data to avoid over/underflow.

5. The system of claim 1, wherein the client component is selected from the group of components consisting of: televisions, and portable computers.

6. The system of claim 5, wherein the client component is a TV.

* * * * *